United States Patent
Bläse et al.

(10) Patent No.: US 6,461,503 B1
(45) Date of Patent: Oct. 8, 2002

(54) INTERENGAGED ROTARY DISC FILTERS

(75) Inventors: Dieter Bläse, Mutlangen; Hans Olapinski, Aichwald; Hans-Peter Feuerpeil, Schwäbisch Gmünd, all of (DE)

(73) Assignee: aaflosystems GmbH & Co. KG, Essingen (DE)

( * ) Notice: Subject to any disclaimer, the term of this patent is extended or adjusted under 35 U.S.C. 154(b) by 0 days.

(21) Appl. No.: 09/576,141

(22) Filed: May 22, 2000

(30) Foreign Application Priority Data

Apr. 19, 2000 (DE) .......................... 100 19 671

(51) Int. Cl.⁷ .............................................. B01D 33/15
(52) U.S. Cl. ........................ 210/194; 210/331; 210/332; 210/406; 210/408; 210/409; 210/416.1; 210/785
(58) Field of Search ................................. 210/330, 331, 210/332, 391, 194, 337, 383, 406, 407, 408, 409, 416.1, 780, 785

(56) References Cited

U.S. PATENT DOCUMENTS

| | | | | |
|---|---|---|---|---|
| 1,264,635 A | * | 4/1918 | Graham | 210/331 |
| 3,466,241 A | * | 9/1969 | Simpson | 210/151 |
| 3,997,443 A | * | 12/1976 | Thissen | 210/150 |
| 4,269,719 A | * | 5/1981 | Yamamoto | 210/522 |
| 4,728,424 A | * | 3/1988 | Miura | 210/331 |

FOREIGN PATENT DOCUMENTS

DE 19502848 A1 6/1995

* cited by examiner

Primary Examiner—Robert J. Popovics
(74) Attorney, Agent, or Firm—Ohlandt, Greeley, Ruggiero & Perle, LLP

(57) ABSTRACT

There is provided an apparatus for the filtration of fluid media, in particular for the pre-screening of media, that has a primary pack of hollow discs, which are arranged parallel to each other at regular distances to each other, the walls of which are made of a sieve material. The apparatus also has a primary, hollow shaft, which penetrates and is fixed to the hollow discs, connecting its interior to the cavities of the discs, and is fitted with a drive. Also included is a secondary pack of discs, which are arranged similarly to the hollow discs of the primary pack. There is a secondary shaft that is arranged similarly to the primary shaft. The two packs with their respective shafts are designed and arranged in such a way that the discs of one pack protrude into the spaces between neighboring discs of the other pack. There is a container that encloses the packs and the shafts. The container has an inlet for the medium to be treated, as well as an outlet for the retentate. Each of the hollow shafts has an outlet for the filtrate.

20 Claims, 2 Drawing Sheets

INTERENGAGED ROTARY DISC FILTERS

The invention encompasses a system for the filtration of media, in particular such media which have an abrasive nature, and which are subsequently to be treated in a membrane filter system.

Filtration systems have become known in a variety of different configurations. They are generally supposed to be able to handle large quantities of medium per unit time, while exhibiting precise separation ability, i.e. effect as complete as possible a separation between the raw material and the desired product. These two functions stand in direct conflict with each other. One can increase the throughput by increasing the size of the flow opening. This will, however, reduce the precision of the separation.

A further problem is that, irrespective of what type of filtration surface is used, sooner or later a filter cake will be deposited on the surface, which will reduce the throughput and over time change the operating characteristics of the system. A number of mechanisms have been designed to prevent the formation of such a filter cake or layer, for example, the installation of scrapers which brush across the filtration surface to clear it of deposits. Agitation and turbulence inducing mechanism such as impellers are also employed to agitate the medium near the filtration surface.

The invention has the objectives of configuring a system of the type described above, which is able to handle large quantities of the medium to be filtered, while achieving a high degree of separation precision, and thereby removing all undesirable materials, in particular abrasive materials. The system also requires little space and has a lower energy consumption than conventional systems.

These objectives are achieved by the features of claim 1

By arranging the hollow discs of a pack of hollow discs in such a way that they mesh with the disc shaped structure of a neighboring pack, one can cause, by means of rotation of the two packs, the surfaces to run across each other. This leads to a cleaning of the surfaces and a reduction or prevention of deposition of solids.

A further benefit is derived from this design.

During the relative rotational motion of the packs, the radially external area of one disc will overlap the radially internal area of the other disc. If the discs of both packs rotate in the same direction the high rotational speed of one disc meets with the low rotational speed of the other disc so that the relative speed in the area of overlap between two plates is, therefore, essentially constant in the radial direction. This has a positive effect on the clearing action, which makes for optimum utilization of the sieve area, which in turn has a positive effect on the throughput The term "Sieve" is understood to mean any type of sieve material. So, for example, a weave or felt can be used. Slotted or perforated sheet metal can also be considered. The size of the openings in the sieve is at least 5 $\mu$m, but preferably larger than 20 $\mu$m.

The invention comprises two main embodiments:

The first embodiment is to use a primary membrane pack, which comprises a hollow shaft as well as hollow discs the walls of which are constructed of a sieve material. A secondary pack comprises a shaft that need not be hollow, and with discs that can have either a sealed outer surface or are hollow.

If the discs of the secondary pack have sealed surfaces, then these discs achieve the one aim of causing agitation of the medium in the container, thereby avoiding the deposition of materials on the sieve surfaces of the primary pack.

If the discs of the secondary pack are also hollow, then the shaft of the secondary pack would also be hollow, allowing these hollow discs to be used to direct the medium to be treated, via suitable openings or nobles, against the surface of the filtering/sieving discs of the primary pack.

In the second embodiment of the invention, the secondary pack is constructed in the same manner as the primary pack. It has a hollow shaft, and hollow discs, the walls of which consist of sieve material.

The invention can be further explained by means of the illustrations. The second embodiment is represented. In particular one can recognize the following:

Figure 1:
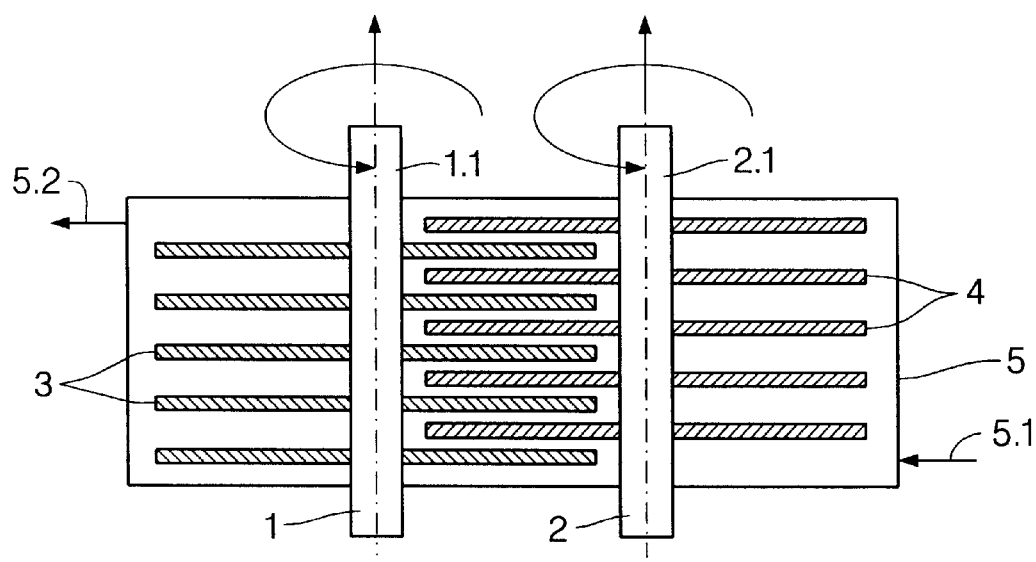
FIG. 1 shows the system according to the invention in a schematic elevation

The system shown in FIG. 1 serves for the filtration of any type of media, for example, process streams in the food processing industry, e.g. Starch production The system has two hollow shafts (1,2). The shafts are arranged vertically. They are sealed at their lower ends.

Attached to the hollow shaft (1) are hollow discs (3), which are referred to as a pack. As one can see, the pack comprises 5 such discs. This quantity can vary. The discs 3 are designed to rotate with the hollow shaft 1 and are fixed to it. The cavities in the hollow discs are connected to the interior of the hollow shaft. The shaft (1) is driven so that it, and the discs (3) attached to it, rotate around its own axis. The discs can also be placed into oscillating motion relative to each other.

Attached to the hollow shaft (2) are hollow discs (4), which are also referred to as a pack. The unit consisting of the hollow shaft (2) and the hollow discs (4), is assembled identically to the unit consisting of hollow shaft (1) and hollow discs (3). Deviations from this design are, however, possible. The discs (4) can, for example, have a greater diameter than the discs (3). In the illustrated case, the discs (3, 4) are round if viewed from above. They can, however, also have other shapes, such as oval.

Both packs are arranged in a container (5). The container has an inlet (5.1) for the medium to be treated, and an outlet (5.2) for discharge of the retentate or concentrate (mud), The two hollow shafts (1,2) have outlets in their upper ends (1.1) and (2.1) respectively for discharge of the filtrate. The hollow shafts also have inlets that allow for the reintroduction of retentate into the system after its removal from the container.

Figure 4:
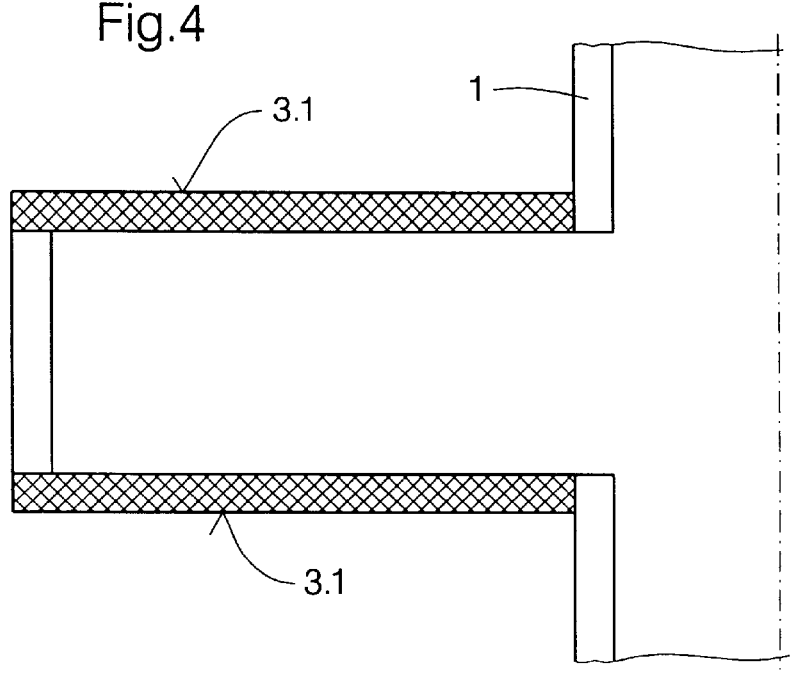
FIG. 4 shows an enlarged sectional side view of a segment of the item of FIG. 1

FIG. 4 illustrates the structure of a single hollow disc (3) As can be seen, the filter areas (3.1) are constructed of a sieve material. The interior of the disc (3) is connected to the interior of the hollow shaft (1).

Any filtration material can be utilized, such as a sieve mesh similar to the mesh of a paper machine sieve, perforated sheet metal, slotted sheet metal or similar. It could also be made from plastic or any other material resistant to the product to be treated.

From FIGS. 1 and 4 one can see that the system operates in the following manner. The medium to be treated is fed to container (5) via inlet (5.1). The desired portion of this material, or the filtrate, flows into the inner cavity of the hollow disc (3, 4), while the retentate is retained by the filter area (3.1). The filtrate then reaches the interior of the hollow shafts (1, 2), and is discharged via the outlets (1.1, 2.1) The retentate, on the other hand, is discharged via the container outlet (5.2).

Figure 2:
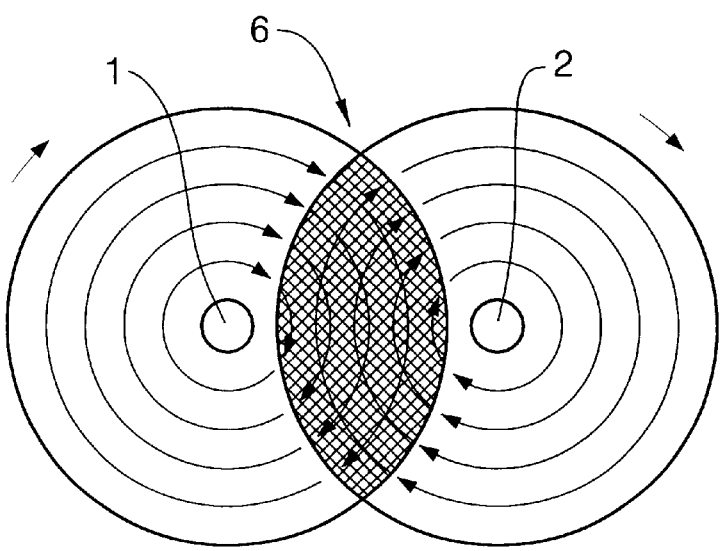
FIG. 2 shows a top view of the system in FIG. 1

FIG. 2 shows a top view of the two packs as laid out in FIG. 1. One can see the hollow shafts (1, 2) which serve to convey the filtrate out of the system. The discs (3, 4) overlap in the area (6). The discs (3) of the primary pack and the discs (4) of the secondary pack both rotate in a clockwise direction. A turbulent cleaning zone is created in the overlapping area (6). The turbulence in this area has a cleaning effect on the filtration surfaces (3.1)

The discs of the primary pack may be rotated at one speed, and the discs of the secondary pack may be rotated at a second speed that is different from the speed of the discs of the primary pack. This allows for generation of a desired turbulence of the fluid media.

The filtration throughput is extremely high. This means that a large quantity of the medium can be processed by the system per unit time. At the same time the energy consumption is very low.

Figure 3:
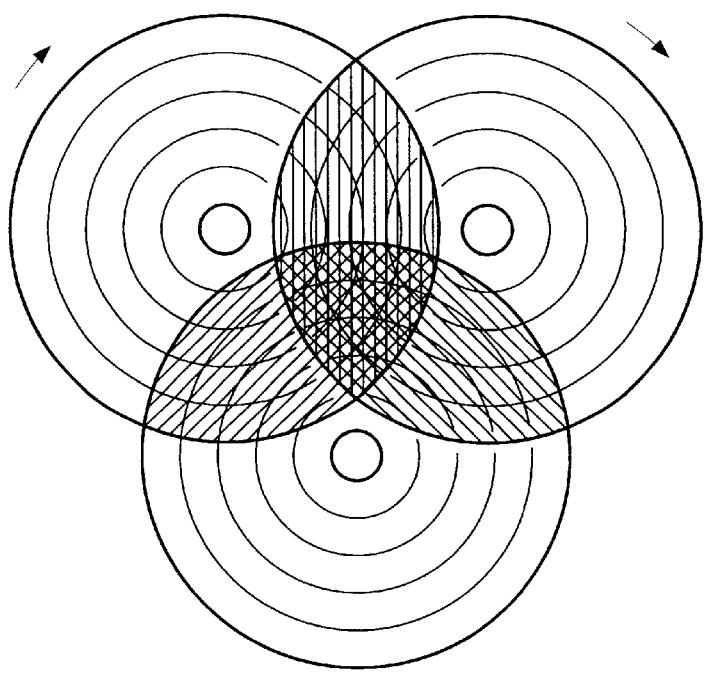
FIG. 3 shows an alternative configuration of the system in FIG. 1, again in top view

The configuration illustrated in FIG. 3 comprises three packs arranged symmetrically.

A further possibility is that even larger numbers of packs are arranged in the same basic system. It is, therefore, possible to place one pack centrally, while the other packs are arranged concentrically around the central pack. Such a configuration is not illustrated here.

What is claimed is:

1. An apparatus for filtration of fluid media comprising:
   at least one primary pack having a plurality of hollow, disc-shaped substrates arranged parallel to each other at regular distances, the plurality of substrates being rotatable, each of the plurality of substrates having walls made of a sieve material, and each of the plurality of substrates having a cavity;
   at least one primary hollow shaft that penetrates the plurality of substrates of the primary pack, the at least one primary shaft being fixed to the plurality of substrates of the primary pack and being connected to the cavities of the plurality of substrates;
   at least one secondary pack having a plurality of disc-shaped substrates arranged parallel to each other at regular distances, each of the plurality of substrates of the secondary pack having a cavity, the plurality of substrates of the secondary pack being rotatable in the same direction as the plurality of substrates of the primary pack, and wherein the plurality of substrates of the primary pack can be rotated at a different speed than the speed of the plurality of substrates of the secondary pack, thereby generating a desired turbulence of the fluid media, and
   at least one secondary shaft that penetrates the plurality of substrates of the secondary pack, the second shaft being fixed to the plurality of substrates of the secondary pack and being connected to the cavities of the secondary substrates, wherein the rotation of the plurality of substrates of the primary and the secondary packs is in the same direction to achieve surface velocities in the overlapping area, whereby a higher velocity differential is created.

2. The apparatus of claim 1, wherein the plurality of substrates of the secondary pack have spaces therebetween.

3. The apparatus of claim 2, wherein the primary and secondary packs are arranged such that the plurality of substrates of the primary pack protrude into the spaces between the plurality of substrates of the secondary pack.

4. The apparatus of claim 1, wherein the primary and secondary packs and the primary and secondary shafts are enclosed by a container.

5. The apparatus of claim 4, wherein said container has an inlet for a medium and an outlet for a retentate.

6. The apparatus of claim 5, wherein said medium in container is under pressure.

7. The apparatus of claim 5, wherein said retentate can be removed from said container, and reintroduced into the apparatus via said inlet.

8. The apparatus of claim 5, wherein said retentate can be removed from said container, and reintroduced into the apparatus via the inlet of a hollow shaft.

9. The apparatus of claim 1, wherein the primary shaft has an outlet for a filtrate.

10. The apparatus of claim 9, wherein said filtrate outlet is under negative pressure.

11. The apparatus of claim 9, wherein said filtrate outlet is under positive pressure.

12. The apparatus of claim 1, wherein the primary and secondary shafts are each equipped with a drive system.

13. The apparatus of claim 1, wherein the cavities of the plurality of substrates of the secondary pack are connected to an interior of the secondary shaft.

14. The apparatus of claim 1, wherein the plurality of substrates of the secondary pack have openings through which media can be directed against the plurality of substrates of the primary pack.

15. The apparatus of claim 1, wherein each of the plurality of substrates of the secondary pack has a surface element to agitate a medium.

16. The apparatus of claim 1, wherein the plurality of substrates of the secondary pack are hollow.

17. The apparatus of claim 1, wherein the plurality of substrates of the secondary pack have walls made of a sieve material.

18. The apparatus of claim 1, wherein the plurality of substrates of the primary and secondary packs can be placed into oscillating motion relative to each other.

19. The apparatus of claim 1, wherein the plurality of substrates of the primary and secondary packs are rotated in the same direction.

20. The apparatus of claim 1, wherein the apparatus is configured in a circulating loop arrangement.

* * * * *